3,590,010
METHOD OF PRODUCING HIGH MOLECULAR WEIGHT POLYMERS OF VICINAL EPOXY COMPOUNDS WITH ORGANOMETALLIC HALIDE-ENOLATE CATALYSTS

Kunio Konishi and Masao Nikki, Osaka-fu, Japan, assignors to Nippon Shokubai Kagaku Kogyo Co., Ltd., Osaka, Japan
No Drawing. Filed Mar. 11, 1969, Ser. No. 806,285
Int. Cl. C08g 23/06
U.S. Cl. 260—2      3 Claims

ABSTRACT OF THE DISCLOSURE

A method of polymerizing alkylene oxides which comprises using as catalyst a reaction product obtained by reacting an alkali metal enolate with a reagent selected from the group consisting of the Grignard reagents and the Blaise reagents, said reaction product being used in an amount in the range of 0.01–10 mol percent based on the monomeric alkylene oxide.

---

This invention relates to a method of producing high-molecular-weight polymers of vicinal epoxy compounds. More specifically, the invention relates to a method of producing high-molecular-weight polymers of vicinal epoxy compounds which is characterized in that a reaction product obtained by reacting an alkali metal enolate with a reagent selected from the group consisting of the Grignard reagents and the Blaise reagents is used as the catalyst.

As the polymerization catalyst of the epoxy compounds, various types of compositions have been known in the past. However, taking for example the polymerization of ethylene oxide, few catalysts of such high activity as can produce high-molecular-weight polymers whose molecular weight reaches as high as several million have been known. Most of those known are so expensive that they are not of practical use from the commercial standpoint.

The object of the present invention resides in the economical production of high-molecular-weight polymers of vicinal epoxy compounds by using an inexpensive catalyst possessing high activity.

It was found that the foregoing object of this invention could be achieved by using as catalyst a reaction product obtained by reacting either a Grignard reagent or a Blaise reagent with an alkali metal enolate.

The alkali metal enolate which is used in the present invention can be readily prepared in the following manner. A metal belonging to Group I–A of the periodic system of elements, i.e. lithium, sodium, potassium, rubidium or cesium, is dispersed in a dispersant, such as naphthalene, anthracene, biphenyl, naphthacene, triphenylene and stilbene, in an amount of at least 1 gram atom of the former per each mole of the latter. This dispersion is then dissolved in a solvent such as dimethyl ether, methylethyl ether, ethylene glycol dimethyl ether, tetrahydrofuran and glycerine trimethyl ether, following which an enolizable (enolically tautomeric) ketone in an equimolar quantity to the alkali metal in said solution is added in small increments to the solution while maintaining the temperature of the solution preferably at below 0° C. The alkali metal enolate is thus obtained. As the foregoing ketone, included are such, for example, as acetone, methyl ethyl ketone, methyl butyl ketone, methyl isobutyl ketone, diisobutyl ketone, methyl vinyl ketone, diethyl ketone, ethyl propyl ketone, acetophenone, propiophenone, cyclopentanone and cyclohexanone. Now, when for example, sodium is used as the alkali metal and acetone and cyclohexanone are used as the ketone, sodium enolates having respectively the following formulas are formed.

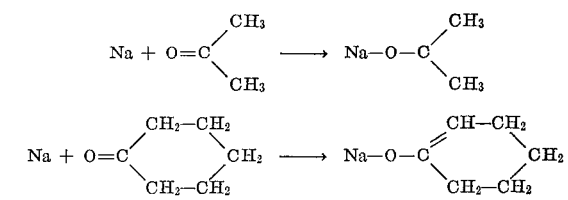

The reagents which are reacted with the hereinbefore described alkali metal enolates in preparing the invention catalysts comprising probably either magnesium or zinc enolate are the compounds which are generally referred to as the Grignard reagents and the Blaise reagents. As is widely known, the Grignard reagents can be generically referred to as being those compounds having the formula $$RM_gX$$

wherein R is an organic group represented by lower alkyl, lower alkenyl, lower alkynyl and aryl groups and X is a halogen represented by chlorine; whereas the Blaise reagents can be generically referred to as being those of the formula $$RZnX$$

wherein R and X are as defined above. Therefore, the reagents of this invention can be generically referred to as being those compounds having the formula $$RMX$$

wherein M is either Mg or Zn, and R and X are as above defined.

The catalyst of the present invention, i.e., the magnesium enolate or zinc enolate, can be prepared by reacting an alkali metal enolate, such as above described, with either a Grignard or a Blaise reagent, in a solvent at a temperature below 50° C., and preferably below 0° C., with the mole ratio of the alkali metal enolate to either the Grignard or the Blaise reagent of 1:0.8–2.0, and preferably close to 1:1. Conveniently used as the solvent for this reaction of the alkali metal enolate and either the Grignard or the Blaise reagent are the ethers such as dimethyl ether, diethyl ether, diisopropyl ether, dibutyl ether, ethylene glycol dimethyl ether and tetrahydrofuran and the hydrocarbons such as benzene, toluene, xylene, isooctane, decane, dodecane, tridecane, Tetralin and Decalin. It is of particular advantage commercially to use the ether which has been used in preparing the alkali metal enolate, since this can be continuously used in the preparation of the magnesium or zinc enolate.

The reaction product otbained by reacting an alkali metal enolate with either the Grignard or the Blaise reagent is used as the polymerization catalyst for producing the epoxy compounds in accordance with the present invention, either in its solution form after having removed by filtration or other suitable means the alkali metal halide which separates out in the reaction solution or in a solid form after having removed the solvent from the solution. On occasions, the solution containing the reaction product can be used as catalyst without removing the alkali metal halide that has separated out in the solution.

The vicinal epoxy compounds that can be polymerized according to the present invention using as catalyst the hereinabove described reaction product are those compounds having in their molecule an epoxy group represented by the formula

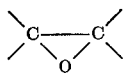

As examples of these vicinal epoxy compounds, mention can be made of the alkylene oxides such as ethylene oxide, propylene oxide, butene oxide, isobutylene oxide, cis-2-butene oxide and trans-2-butene oxide; the substituted alkylene oxides such as epichlorohydrin, epibromohydrin, methacryl chloride epoxide and perfluoropropylene oxide; the alicyclic epoxides such as cyclohexene oxide and vinylcyclohexene oxide; the alkyl glycidyl ethers such as methyl glycidyl ether and ethyl glycidyl ether; allyl glycidyl ether; phenyl glycidyl ether; the substituted phenyl glycidyl ethers such as chlorophenyl glycidyl ether; styrene oxide; the substituted styrene oxides such as 2-methylstyrene oxide; butadiene mono- and diepoxides; and 1-methylamino-2,3-epoxypropane. The vicinal epoxy compounds which are especially suitable in this invention are the lower alkylene oxides.

There is no particular restriction as to the polymerization method to be used in the polymerization reaction of the invention and any of the known methods such as the bulk, solution, suspension and blowing polymerization techniques can be used to carry out the reaction. Further, these methods can be carried out by either the batchwise or continuous technique. In the case where a diluent or solvent is to be used in carrying out the polymerization reaction, hydrocarbon and ether compounds which are inert to the epoxy compound and catalyst, including the hydrocarbons such as n-hexane, cyclohexane, heptane, octane, benzene, toluene, xylene and ligroin or the ethers such as dimethyl ether, dibutyl ether and tetrahydrofuran, are preferably used as the diluent or solvent. While there is no particular restriction as to the amount of the catalyst to be used in polymerizing the epoxy compound, the usual amount is 0.01–10 mol percent, and preferably 0.1–3 mol percent, based on the monomeric epoxy compound. The whole amount of the catalyst required may be added to the reaction system ta once or it may be added in small increments continuously or intermittently during the progress of the polymerization reaction. In the case of the polymerization of certain classes of the epoxy compounds, it becomes possible to adjust the molecular weight as well as enhance the polymerization speed by the addition to the reaction system, in addition to the aforesaid catalyst, in an amount of 0.1–300 mol percent, and preferably 10–100 mol percent, based on the catalyst, of thio ethers such as dimethylthio ether and diethylthio ether, tertiary amines such as trimethylamine, triethylamine, trinormalbutylamine and dimethylaniline, tertiary phosphines such as trinormalbutylphosphine and triphenylphosphine, and sulfoxides such as dimethyl sulfoxide and diethylsulfoxide.

Again, there is imposed no particular restriction as to the polymerization pressure in carrying out the polymerization reaction in the present invention, it being possible to conduct the reaction under superatmospheric, reduced or atmospheric pressure. It is usually however convenient to carry out the reaction under either atmospheric or autogenous pressure. Likewise, there is no particular restriction as to the reaction temperature, it being possible to carry out the polymerization reaction over a broad range, e.g., of from −100° to +150° C. In polymerizing the lower alkylene oxides, the reaction can be readily carried out at temperatures in the neighborhood of room temperature.

When epoxy compounds are polymerized by the invention method, not only is the polymerization speed of the epoxy compounds fast and their yield great but also the polymers obtained are of high molecular weight. Particularly, when the invention method is employed in the polymerization of such lower alkylene oxides as ethylene oxide or propylene oxide, high polymers of estimated molecular weight of several million can be readily obtained. Further, the catalyst used in this invention not only can be prepared at lower cost than that of the conventional catalysts but also can be more easily managed, and hence it is very effective in obtaining high polymers of epoxy compounds commerically.

Next, the following examples are given for further illustration of the invention in detail. These examples are however not intended to limit the scope of the present invention.

The molecular weights of the polymers obtained in these examples have been shown by their reduced viscosities ($\eta_{sp.}/c.$). These values have been obtained by measurements at 30° C. on a solution whose polymer concentration in the solvent is 0.1 g./dl. The measurement was made on an aqueous solution in the case of polyethylene oxide, whereas it was made on a benzene solution in the case of polypropylene oxide.

EXAMPLE 1

Preparation of catalyst

A flask equipped with a thermometer, stirrer, dropping funnel and gas inlet and outlet lines was purged with argon, after which 7.56 grams of a dispersion in naphthalene of sodium (mole ratio 1:1, sodium content 0.05 gram atom) and 50 ml. of tetrahydrofuran were placed in the flask and the sodium dispersion was dissolved with stirring under argon. This was followed by cooling the solution to −18° C. and adding dropwise thereto of 2.9 grams (0.05 mol) of acetone diluted with 5 ml. of tetrahydrofuran, over a period of 10 minutes. Simultaneously upon completion of the dropping the green color of sodium-naphthalene disappeared.

Next, a tetrahydrofuran solution of n-butyl magnesium chloride obtained by reacting 0.055 gram atom of magnesium and 0.05 mol of n-butyl chloride in 25 ml. of tetrahydrofuran was added dropwise over a period of 18 minutes to the hereinbefore described sodium enolate-containing solution cooled to −20° C.

The resulting precipitate of sodium chloride (containing naphthalene) was removed by filtration under argon, whereupon a clear, light yellow solution was obtained. This solution was quantitatively analyzed for its chlorine content by the Volhard method, but no chlorine was contained at all. Where the butane resulting by hydrolysis with a dilute acid was quantitatively analyzed, it was 83% of theory.

EXAMPLE 2

The inside of a sealed tube of glass having a side tube at its upper end was purged with argon, after which 50 ml. of cyclohexane and 0.002 mol (3.1 ml.) of the catalyst obtained in Example 1 were added thereto.

After cooling the sealed tube to −78° C., it was charged with 8.8 grams (0.2 mol) of ethylene oxide by means of distallation under reduced pressure. The tube was then melt-sealed and allowed to stand still for 17 hours at room temperature (25–30° C.). The resulting polymer was removed and, after washing with ether, was vacuum dried for 20 hours at 30° C. 8.4 grams (correponding to a yield of 95%) of polyethylene oxide was obtained. The reduced viscosity of the polymer was 24.5.

EXAMPLE 3

The inside of a sealed tube of glass having a side tube at its upper end was purged with argon, after which 10 ml. of n-tridecane and 0.002 mol (3.1 ml.) of the catalyst obtained in Example 1 were introduced into the sealed tube via the side tube using a syringe. Next, the sealed tube was held for one hour under pressure of 3 mm. Hg while stirring the contents to distill off the tetrahydrofuran (the solvent of the catalyst). Argon was then introduced and the pressure of the sealed tube was returned to atmospheric pressure, after which 40 ml. of cyclohexane was added and the tube was cooled to —78° C. 8.8 grams (0.2 mol) of ethylene oxide was then charged to the tube by means of distillation under reduced presssure.

The sealed tube was allowed to stand still for 5.5 hours sponding to a yield of 95%) of polyethylene oxide was removed from the tube, washed with ether and dried. A polymer having a reduced viscosity of 15.3 was obtained at a yield of 99%.

EXAMPLE 4

The polymerization reaction was carried out as in Example 2 except that 11.6 grams of propylene oxide was used as the monomer, and the reaction was carried out at a temperature of 50° C. for 16 hours. The resulting polymer was a mass swelled by means of cyclohexane. This mass was cut into minute shreds and vacuum dried. Polypropylene oxide having a reduced viscosity of 13.7 was obtained at a yield of 96%.

EXAMPLE 5

Ten ml. of n-tridecane and 0.002 mol (3.1 ml.) of the catalyst obtained in Example 1 were placed in a sealed tube of glass, after which the tetrahydrofuran was removed by distilling off as in Example 3. Argon was introduced and the pressure of the tube was returned to atmospheric pressure, following which 30 ml. of cyclohexane and 10 ml. of phenyl glycidyl ether were added. After melt-sealing the tube, it was allowed to stand still for 24 hours in a water bath of 60° C. 6.8 grams of a powdery polymer was obtained whose melting point was about 204° C. When this polymer was dissolved by heating in a 1:3 liquid mixture of trichloroethylene and phenol containing 2% of alpha-pinene and the reduced viscosity of this solution was measured, it was 8.6.

EXAMPLES 6–9

For the purpose of investigating the changes that take place with the passage of time of the catalyst obtained in Example 1, the catalyst was allowed to stand at room temperature for varied periods of time, namely: 5, 14, 21 and 30 days. The respective catalysts were then used for polymerizing ethylene oxide under identical conditions as employed in Example 2, with the results shown in Table I.

TABLE I

| | Period left standing (day) | Yield (percent) | Reduced viscosity ($\eta$ sp./c.) |
|---|---|---|---|
| Example No.: | | | |
| 6 | 5 | 96 | 26.4 |
| 7 | 14 | 94 | 26.0 |
| 8 | 21 | 88 | 26.6 |
| 9 | 30 | 91 | 24.8 |

It is apparent from the results shown in Table I that the catalytic activity of the catalyst obtained in Example 1 does not decline for a period of at least one month.

EXAMPLE 10

Operating as in Example 1, a tetrahydrofuran solution containing 0.045 mol of sodium isopropenoxide was prepared, to which solution was added a tetrahydrofuran solution containing 0.045 mol of ethyl lead chloride and reacted at —15 to —25° C. The sodium chloride which was separated out was separated by filtration in a stream of argon.

One-tenth by volume of a catalyst solution obtained in this manner was used and 8.8 grams of ethylene oxide was polymerized as in Example 2. As a result, 7.1 grams of polyethylene oxide having a reduced viscosity of 18.6 was obtained.

EXAMPLE 11

0.002 mol (3.1 ml.) of the catalyst obtained in Example 1 and 0.0001 mol of trinormalbutylamine were reacted for 30 minutes at 30° C. in a sealed tube, after which 50 ml. of cyclohexane was added and thereafter 10 ml. of ethylene oxide was charged by means of distillation. The tube was then melt-sealed and allowed to stand for 7 hours at 30° C., whereupon 8.5 grams of polyethylene oxide having a reduced viscosity of 17.0 was obtained.

EXAMPLES 12–19

Sodium acetone synthesized as in Example 1 was reacted with the various reagents (indicated in Table II) of the formula RMX wherein R is an organic group, M is Mg or Zn and X is halogen. Using these reaction products as catalysts, 10 ml. each of ethylene oxide were polymerized. The polymerization reactions were operated as in Example 3 using the catalyst in amounts of 0.002 mol and cyclohexane (diluent) in amounts of 50 ml. The results obtained are shown in Table II.

TABLE II

| | RMX | Polymerization temperature (° C.) | Polymerization time (hr.) | Yield (gm.) | Reduced viscosity ($\eta$ sp./c.) |
|---|---|---|---|---|---|
| Example No.: | | | | | |
| 12 | $CH_3MgCl$ | 30 | 7 | 8.4 | 18.8 |
| 13 | $C_2H_5MgCl$ | 30 | 18 | 8.8 | 13.6 |
| 14 | $n\text{-}C_4H_9MgCl$ | 50 | 4 | 8.7 | 20.7 |
| 15 | $CH_2=CHMgCl$ | 40 | 5 | 8.5 | 20.0 |
| 16 | $C_6H_5MgCl$ | 30 | 18 | 8.0 | 12.3 |
| 17 | $CH_2=CH\text{--}CH_2MgCl$ | 20 | 20 | 8.2 | 13.7 |
| 18 | $C_2H_5ZnI$ | 30 | 10 | 8.4 | 12.1 |
| 19 | $CH_3ZnCl$ | 30 | 10 | 8.5 | 18.5 |

EXAMPLES 20–24

Various classes of sodium ketones were synthesized as in Example 1 except that instead of acetone the various ketones indicated in Table III were used, after which these sodium ketones were each reacted with equimolar quantities of n-butyl chloride (Grignard reagent). 8.8 grams each of ethylene oxide were polymerized by operating as in Example 3 using as catalysts the various resulting classes of magnesium enolate. The amount used of the catalyst was 0.002 mol and that of cyclohexane (diluent) was 50 ml. The results are shown in Table III.

TABLE III

| | Ketone | Polymerization temperature (° C.) | Polymerization time (hr.) | Yield (gm.) | Reduced viscosity ($\eta$ sp./c.) |
|---|---|---|---|---|---|
| Example No.: | | | | | |
| 20 | Acetophenone | 30 | 20 | 7.5 | 12.3 |
| 21 | Methyl ethyl ketone | 30 | 20 | 5.0 | 11.5 |
| 22 | Cyclohexanone | 30 | 20 | 5.6 | 18.6 |
| 23 | Diisobutyl ketone | 30 | 20 | 2.5 | 8.5 |
| 24 | Methyl vinyl ketone | 30 | 20 | 7.8 | 25.3 |

Example 25

0.2 mol of propylene oxide and 0.04 mol of allyl glycidyl ether were polymerized using 0.002 mol of the catalyst obtained in Example 1 by operating as in Example 1 by operating as in Example 2 excepting that a polymerization temperature of 60° C. and a polymerization time of 20 hours were employed. Eleven grams of a copolymer having a reduced viscosity of 15.3 was obtained. This reduced viscosity was a value obtained by measuring on a benzene solution wherein the concentration of the copolymer was 0.1 g./dl.

Example 26

0.2 mol of ethylene oxide and 0.02 mol of epichlorohydrin were polymerized using 0.002 mol of the catalyst obtained in Example 1 by operating as in Example 2 excepting that a polymerization temperaure of 30° C. and a polymerization time of 20 hours were employed. 2.3 grams of a copolymer insoluble in ether was obtained. The reduced viscosity as measured at 30° C. on a benzene solution wherein the concentration of this copolymer was 0.1 g./dl. was 7.0.

We claim:

1. A method of polymerizing monomeric vicinal monoepoxides which comprise using as the catalyst a reaction product obtained by reacting an alkali metal enolate with an organo-metallic halide of the formula

RMX wherein R is a hydrocarbon radical selected from the group consisting of lower alkyl, lower alkenyl, and aryl radicals; M is magnesium or zinc; and X is a halogen.

2. The method of claim 1 wherein said catalyst is used in an amount of 0.01–10 mol percent based on the monomer monoexpoxide.

3. A method of polymerizing monomeric alkylene oxides which comprises using as the catalyst a reaction product obtained by reacting an alkali metal enolate with an organometallic halide of the formula

RMX wherein R is a hydrocarbon radical selected from the group consisting of lower alkyl, lower alkenyl, and aryl radicals; M is magnesium or zinc; and X is a halogen; said catalyst being used in an amount in the range of 0.01–10 mol percent based on the monomeric alkylene oxide.

References Cited

UNITED STATES PATENTS

| | | | |
|---|---|---|---|
| 3,024,219 | 3/1962 | France et al. | 260—47 |
| 3,127,371 | 3/1964 | Garty et al. | 260—47 |
| 3,234,251 | 2/1966 | Garty et al. | 260—429.9 |
| 3,396,125 | 8/1968 | Wofford et al. | 260—2 |
| 3,450,683 | 6/1969 | Hsieh et al. | 260—88.3 |

WILLIAM H. SHORT, Primary Examiner

E. A. NIELSEN, Assistant Examiner

U.S. Cl. X.R.

252—431; 260—47, 615